(12) United States Patent
Pavlina

(10) Patent No.: US 11,913,099 B2
(45) Date of Patent: Feb. 27, 2024

(54) PRESS HARDENED STEEL WITH EXTREMELY HIGH STRENGTH AND METHOD FOR PRODUCTION

(71) Applicant: AK Steel Properties, Inc., West Chester, OH (US)

(72) Inventor: Erik James Pavlina, Lebanon, OH (US)

(73) Assignee: Cleveland-Cliffs Steel Properties Inc., West Chester, OH (US)

( * ) Notice: Subject to any disclaimer, the term of this patent is extended or adjusted under 35 U.S.C. 154(b) by 0 days.

(21) Appl. No.: 15/903,288

(22) Filed: Feb. 23, 2018

(65) Prior Publication Data

US 2018/0251875 A1    Sep. 6, 2018

Related U.S. Application Data

(60) Provisional application No. 62/465,523, filed on Mar. 1, 2017.

(51) Int. Cl.
  *C22C 38/38* (2006.01)
  *C22C 38/32* (2006.01)
  (Continued)

(52) U.S. Cl.
  CPC ............ *C22C 38/38* (2013.01); *B32B 15/012* (2013.01); *B32B 15/013* (2013.01); *C21D 1/673* (2013.01);
  (Continued)

(58) Field of Classification Search
  CPC .......... C21D 1/673; C21D 9/46; C22C 38/02; C22C 38/04; C22C 38/12; C22C 38/22;
  (Continued)

(56) References Cited

U.S. PATENT DOCUMENTS

| 4,171,233 A | 10/1979 | Vander |
| 5,695,576 A | 12/1997 | Beguinot |

(Continued)

FOREIGN PATENT DOCUMENTS

| EP | 2093304 | 8/2009 |
| EP | 2103704 | 9/2009 |

(Continued)

OTHER PUBLICATIONS

ASM Handbook, vol. 5: Surface Engineering C.M. Cotell, J.A. Sprague, and F.A. Smidt, Jr., editors, p. 339-348 DOI: 10.31399/asm.hb.v05.a0001270. 1994. (Year: 1994).*

(Continued)

*Primary Examiner* — Nicholas A Wang
(74) *Attorney, Agent, or Firm* — Frost Brown Todd LLP

(57) ABSTRACT

Press hardened steels exhibit increased strength in the press hardened steel parts without a corresponding decrease in elongation. Substitutional elements are included in the steel composition to increase the strength of martensite through a combination of substitutional solute strengthening and a reduction in softening that results from autotempering. Softening as a result of autotempering is minimized by suppression of the martensite start (Ms) temperature through the alloying. As a result of the increased hardenability in the proposed compositions that results from various additions of manganese, chromium, molybdenum, and niobium, the steel compositions permit a boron-free press hardening steel.

13 Claims, 8 Drawing Sheets

(51) Int. Cl.

| | |
|---|---|
| *C22C 38/22* | (2006.01) |
| *C22C 38/24* | (2006.01) |
| *C22C 38/26* | (2006.01) |
| *C23C 2/28* | (2006.01) |
| *B32B 15/01* | (2006.01) |
| *C21D 1/673* | (2006.01) |
| *C23C 2/06* | (2006.01) |
| *C23C 2/12* | (2006.01) |
| *C22C 38/12* | (2006.01) |
| *C22C 38/04* | (2006.01) |
| *C22C 38/02* | (2006.01) |
| *C23C 2/02* | (2006.01) |
| *C21D 9/46* | (2006.01) |

(52) U.S. Cl.
CPC ............. *C22C 38/02* (2013.01); *C22C 38/04* (2013.01); *C22C 38/12* (2013.01); *C22C 38/22* (2013.01); *C22C 38/24* (2013.01); *C22C 38/26* (2013.01); *C22C 38/32* (2013.01); *C23C 2/02* (2013.01); *C23C 2/024* (2022.08); *C23C 2/0224* (2022.08); *C23C 2/06* (2013.01); *C23C 2/12* (2013.01); *C23C 2/28* (2013.01); *C21D 9/46* (2013.01)

(58) Field of Classification Search
CPC ......... C22C 38/24; C22C 38/26; C22C 38/32; C22C 38/38; C23C 2/06; C23C 2/12
See application file for complete search history.

(56) References Cited

U.S. PATENT DOCUMENTS

| | | | |
|---|---|---|---|
| 6,562,153 B1 | 5/2003 | Uehara et al. | |
| 7,241,327 B2 | 7/2007 | Henmi et al. | |
| 7,608,155 B2 | 10/2009 | Sun | |
| 7,611,590 B2 | 11/2009 | Liang | |
| 8,562,761 B2 | 10/2013 | Gunnarsson et al. | |
| 8,628,630 B2 | 1/2014 | Kobayashi et al. | |
| 9,689,050 B2 | 6/2017 | Bouaziz et al. | |
| 9,920,408 B2 | 3/2018 | Nam et al. | |
| 10,106,875 B2 | 10/2018 | Takagi et al. | |
| 2009/0236015 A1 | 9/2009 | Sasaoka et al. | |
| 2011/0259482 A1 | 10/2011 | Peters et al. | |
| 2012/0216925 A1* | 8/2012 | Kobayashi | C22C 38/02 |
| | | | 148/654 |
| 2013/0095347 A1 | 4/2013 | Kawasaki et al. | |
| 2014/0076470 A1 | 3/2014 | Zhu et al. | |
| 2014/0212687 A1 | 7/2014 | Vlot et al. | |
| 2014/0308156 A1 | 10/2014 | Oh et al. | |
| 2015/0050519 A1 | 2/2015 | Nonaka et al. | |
| 2015/0144233 A1 | 5/2015 | Park et al. | |
| 2015/0176109 A1 | 6/2015 | Novotny | |
| 2015/0354035 A1* | 12/2015 | Mizuta | C22C 38/12 |
| | | | 148/504 |
| 2016/0017469 A1 | 1/2016 | Ehrhardt et al. | |
| 2016/0208352 A1 | 7/2016 | Suikkanen et al. | |
| 2016/0326608 A1* | 11/2016 | Hayashi | C22C 38/02 |
| 2017/0002435 A1 | 1/2017 | Jeong et al. | |
| 2017/0002450 A1 | 1/2017 | Kim et al. | |
| 2017/0306437 A1* | 10/2017 | Nakagawa | B32B 15/012 |
| 2019/0093191 A1 | 3/2019 | Nakagawa et al. | |
| 2019/0264297 A1* | 8/2019 | Palzer | C21D 1/26 |
| 2019/0309385 A1* | 10/2019 | Yi | C21D 8/0405 |

FOREIGN PATENT DOCUMENTS

| | | | |
|---|---|---|---|
| EP | 2581465 A1 | | 4/2013 |
| JP | H06179945 A | | 6/1994 |
| JP | 2003129175 A | | 5/2003 |
| JP | 2005177805 | * | 7/2005 |
| JP | 2013-176803 | | 9/2013 |
| JP | 2015-131995 | | 7/2015 |
| JP | 6004138 | * | 9/2016 |
| JP | 6004138 B2 | | 10/2016 |
| TW | 185570 | | 6/1992 |
| TW | 200932923 | | 8/2009 |
| TW | 201615862 | | 5/2016 |
| WO | WO 2009/082091 | | 7/2009 |
| WO | WO 2013/118862 | | 5/2013 |
| WO | WO 2013/107864 | | 7/2013 |
| WO | 2015144318 A1 | | 10/2015 |
| WO | WO 2016/016676 | | 2/2016 |
| WO | WO 2016/146581 | | 9/2016 |
| WO | WO 2017/021464 | | 2/2017 |
| WO | WO 2018/067554 | | 4/2018 |
| WO | 2018160700 A1 | | 9/2018 |

OTHER PUBLICATIONS

International Search Report and Written Opinion for International Application No. PCT/US2018/019483, 14 pages.

Taiwanese Office Action dated Aug. 23, 2018 for Application No. 107106708, 13 pages.

* cited by examiner

PRESS HARDENED STEEL WITH EXTREMELY HIGH STRENGTH AND METHOD FOR PRODUCTION

PRIORITY

This application claims priority to U.S. Provisional Application Ser. Nos. 62/465,523, filed Mar. 1, 2017, entitled "Press Hardened Steel with Extremely High Strength and Method for Production," the disclosure of which is incorporated by reference herein.

BACKGROUND

The present application relates to an improvement in press hardened steels, hot press forming steels, hot stamping steels, or any other steel that is heated to an austenitization temperature, and formed and quenched in a stamping die to achieve desired mechanical properties in the final part. In this application, they will all be referred to as "press hardened steels."

Press hardened steels are primarily used as structural members in automobiles where high strength, low weight, and improved intrusion resistance is desired by automobile manufacturers.

Conventional press hardened steels, such as 22MnB5 steel, are alloyed with boron for increased hardenability. The strength of press hardened steels can easily be increased by increasing the carbon content of the steel however high levels of carbon reduce weldability and reduce the elongation to fracture (also called total elongation) of the steel.

Current industrial processing of prior art press hardened steel involves heating a blank (piece of steel sheet) to a temperature greater than the $A_3$ temperature (the austenitization temperature), typically in the range 900-950° C., holding the material at that temperature for a certain duration, placing the austenitized blank into a hot stamping die, forming the blank to the desired shape, and quenching the material in the die to a low temperature such that martensite is formed. The end result is a material with a high ultimate tensile strength and a fully martensitic microstructure.

The as-quenched microstructure of prior art press hardened steel is fully martensitic. Conventional press hardened steels (for example 22MnB5) have ultimate tensile strengths of approximately 1500 MPa with total elongations of approximately 6-8%.

SUMMARY

The steels of the present application solve the problem of low elongation while maintaining, or increasing, strength in press hardened steels by a novel alloying strategy that incorporates transition metal elements that increase the strength of the steel through a combination of substitutional solute strengthening and a reduction in softening that results from autotempering.

DETAILED DESCRIPTION

Figure 1:
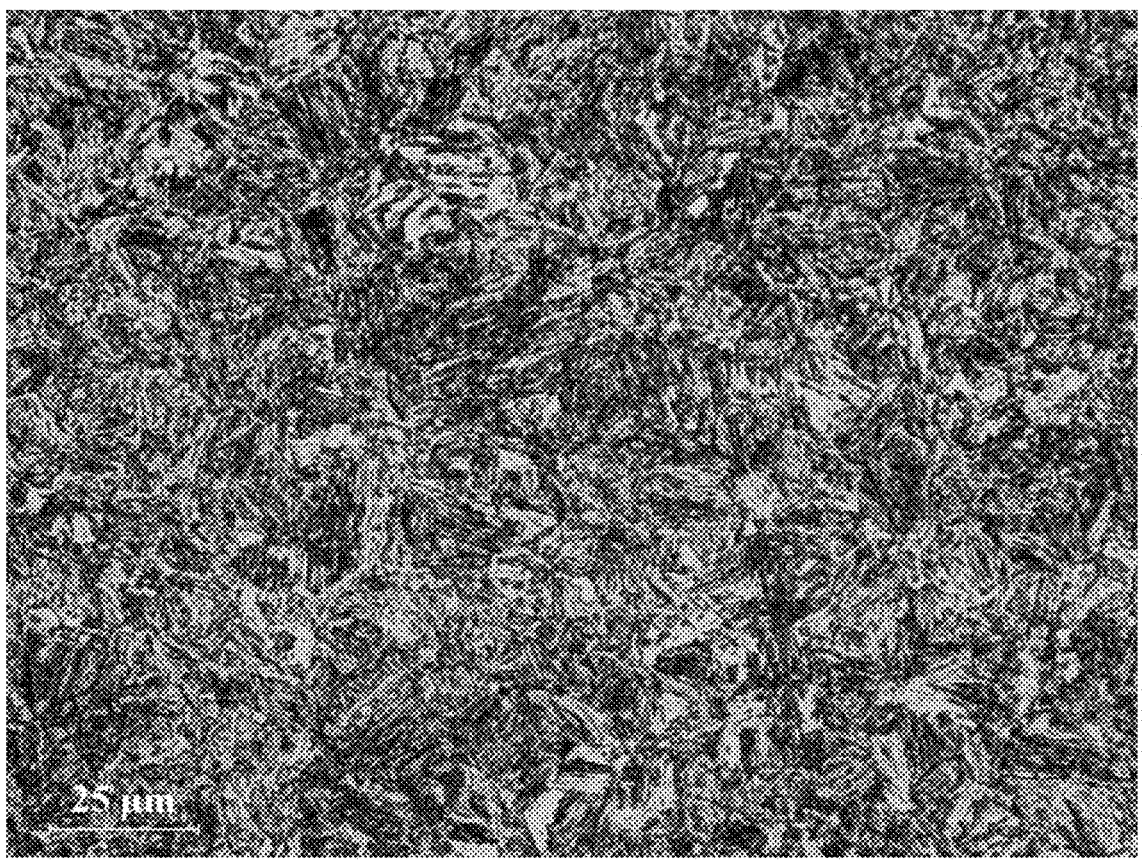
FIG. 1. depicts a light optical micrograph of a press hardened steel of alloy 4339-1 after austenitizing at PMT 848° C. for 300 seconds and simulated press hardening

The press hardened steels of the present application increase the strength of press hardened steel parts without a corresponding decrease in elongation. The strength of press hardened steels can easily be increased by increasing the carbon content of the steel, however high levels of carbon reduce weldability and reduce the elongation to fracture of the steel. The present alloys employ a novel alloying strategy that uses substitutional elements to increase the strength of martensite through a combination of substitutional solute strengthening and a reduction in softening that results from autotempering. Softening as a result of autotempering is minimized by suppression of the martensite start (Ms) temperature through alloying. As a result of the increased hardenability in the present compositions that results from various additions of manganese, chromium, molybdenum, niobium, and vanadium, the novel compositions permit a boron-free press hardening steel.

In addition to iron and other impurities incidental to steelmaking, the embodiments of the present alloys include manganese, silicon, carbon, chromium, molybdenum, niobium, and/or vanadium, all in concentrations sufficient to obtain one or more of the above benefits. In some embodiments, the press hardened steel includes manganese, silicon, carbon, and at least one of chromium, molybdenum, niobium, and/or vanadium, as well as iron and other impurities incidental to steelmaking. The concentrations and effects of these and other alloying elements are summarized below.

Carbon is added to reduce the martensite start temperature, provide solid solution strengthening, and to increase the hardenability of the steel. Carbon is an austenite stabilizer. In certain embodiments, carbon can be present in concentrations of 0.1-0.50 weight %; in other embodiments, carbon can be present in concentrations of 0.1-0.35 weight %; and in still other embodiments, carbon can be present in concentrations of about 0.22-0.25 weight %.

Manganese is added to reduce the martensite start temperature, provide solid solution strengthening, and to increase the hardenability of the steel. Manganese is an austenite stabilizer. In certain embodiments, manganese can be present in concentrations of 2.0-8.0 weight %; in other embodiments, manganese can be present in concentrations of 2.0-5.0 weight %; in still other embodiments, manganese can be present in concentrations of greater than 3.0 weight %-8.0 weight %; and in still other embodiments, manganese can be present in concentrations of greater than 3.0 weight %-5.0 weight %.

Silicon is added to provide solid solution strengthening. Silicon is a ferrite stabilizer. In certain embodiments, silicon can be present in concentrations of 0.1-0.5 weight %; in other embodiments, silicon can be present in concentrations of 0.2-0.3 weight %.

Molybdenum is added to provide solid solution strengthening, to increase the hardenability of the steel, to provide microstructural refinement, and to protect against embrittlement. In certain embodiments, molybdenum can be present in concentrations of 0-2.0 weight %; in other embodiments, molybdenum can be present in concentrations of 0.0-0.6 weight %; in still other embodiments, molybdenum can be present in concentrations of 0.1-2.0 weight %; in other embodiments, molybdenum can be present in concentrations of 0.1-0.6 weight %; and in yet other embodiments, molybdenum can be present in concentrations of 0.4-0.5 weight %.

Chromium can be added to reduce the martensite start temperature, provide solid solution strengthening, and increase the hardenability of the steel. Chromium is a ferrite stabilizer. In certain embodiments, chromium can be present in concentrations of 0-6.0 weight %; in other embodiments, chromium can be present in concentrations of 2.0-6.0 weight %; in other embodiments, chromium can be present in concentrations of 0.2-6.0 weight %; and in other embodiments chromium can be present in concentrations of 0.2-3.0 weight %.

Niobium can be added to increase strength and improve hardenability of the steel. In some embodiments niobium can also be added to provide improved grain refinement. In certain embodiments, niobium can be present in concentrations of 0-0.1 weight %; in other embodiments, niobium can be present in concentrations of 0.01-0.1 weight %; and in other embodiments, niobium can be present in concentrations of 0.001-0.055 weight %.

Vanadium can be added to increase strength and improve hardenability of the steel. In certain embodiments, vanadium can be present in concentrations of 0-0.15 weight %; and in other embodiments, vanadium can be present in concentrations of 0.01-0.15 weight %.

Boron can be added to increase the hardenability of the steel. In certain embodiments, boron can be present in concentrations of 0-0.005 weight %.

The press hardened steels can be processed using conventional steel making, roughing, and finishing processes. For example, the steels can be continuously cast to produce slabs approximately 12-25 cm in thickness. Slabs are then reheated at temperatures of 1200-1320° C., and hot rolled to a final gauge of ≥2.5 mm, with the final reduction pass occurring at a temperature of approximately 950° C. Steels are then coiled at temperatures of 400-675° C. After cooling, the steel coils may be annealed at temperatures of 600-900° C. for times longer than 1 second, and pickled, prior to cold reduction. One or more intermediate annealing and reduction steps may be required before reaching the desired thickness. Such intermediate annealing utilizes temperatures similar to the first annealing treatment.

The alloys of the present application can also be coated with an aluminum-based coating, a zinc-based coating (either galvanized or galvannealed), after cold rolling and before hot stamping. Such coating can be applied to the steel sheet using processes known in the art, including hot dip coating or electrolytic coating. Because of the lower critical temperatures, press hardening of the present alloys after they have been coated is less likely to result in melting of the coating and the detrimental effects associated with such melting.

Example 1

Table 1 lists steel compositions of the press hardened steel alloys that have been tested.

Alloys of the composition of Table 1 were prepared using standard steel making processes. All concentrations are in weight %. In addition, a prior art 22MnB5 press hardened steel was also prepared, and its typical composition is also provided.

TABLE 1

| Alloy | C | Si | N | Mn | Cr | Cu | Ni | P | S | Ti | Al | Mo | Nb | V |
|---|---|---|---|---|---|---|---|---|---|---|---|---|---|---|
| 4339-1 | 0.228 | 0.26 | 0.0032 | 1.98 | 0.20 | 0 | 0 | 0.003 | 0.004 | 0.001 | 0.003 | 0.002 | 0.001 | 0.001 |
| 4339-2 | 0.223 | 0.26 | 0.0041 | 2.98 | 0.20 | 0.001 | 0 | 0.003 | 0.004 | 0.001 | 0.003 | 0.001 | 0.001 | 0.001 |
| 4340-1 | 0.231 | 0.25 | 0.0053 | 3.99 | 0.20 | 0 | 0 | 0.002 | 0.007 | 0.001 | 0.003 | 0.001 | 0.002 | 0.001 |
| 4340-2 | 0.230 | 0.25 | 0.006 | 4.97 | 0.20 | 0 | 0 | 0.002 | 0.008 | 0.001 | 0.003 | 0.001 | 0.001 | 0.01 |
| 4341-1 | 0.228 | 0.25 | 0.0066 | 3.96 | 0.20 | 0.001 | 0 | 0.006 | 0.008 | 0.002 | 0.003 | 0.48 | 0.051 | 0.001 |
| 4341-2 | 0.224 | 0.26 | 0.0089 | 3.97 | 0.20 | 0 | 0.001 | 0.006 | 0.009 | 0.002 | 0.004 | 0.48 | 0.051 | 0.096 |
| 4342-1 | 0.229 | 0.25 | 0.010 | 3.00 | 2.98 | 0.001 | 0.001 | 0.002 | 0.008 | 0.002 | 0.003 | 0.002 | 0.002 | 0.001 |
| 4342-2 | 0.233 | 0.25 | 0.007 | 2.97 | 2.92 | 0.001 | 0.001 | 0.007 | 0.008 | 0.002 | 0.003 | 0.48 | 0.055 | 0.001 |
| 22MnB5 | 0.20-0.24 | 0.20-0.30 | <0.007 | 1.16-1.30 | 0.15-0.25 | <0.10 | <0.10 | <0.020 | <0.005 | 0.025-0.045 | 0.020-0.060 | <0.03 | <0.006 | <0.006 |

Mechanical properties were assessed after a press hardening simulation in which the steels of Table 1 were austenitized at peak metal temperatures (PMT) that were 25-30° C. above the Ac3 temperature (that is, the temperature at which the ferrite to austenite transformation is complete on heating). Steels were then quenched in flat, water-cooled copper dies. Uniaxial tensile tests at room temperature and quasi-static rates were performed to measure the strength and elongation of the press hardened steels. Table 2 summarizes processing temperatures and mechanical properties of the steels after austenitizing for a specified time. The trial heats exhibited unexpectedly high strengths at low carbon concentrations that are typical of the conventional 22MnB5 press hardening steel.

TABLE 2

Mechanical Properties of Press Hardened Steels After Austenization for Time and Simulated Press Hardening

| Alloy | Ms (° C.) | PMT (° C.) | Time (s) | Yield Strength (MPa) | Ultimate Tensile Strength (MPa) | Total Elongation (%) |
|---|---|---|---|---|---|---|
| 4339-1 | 364 | 848 | 300 | 1085 | 1567 | 8.2 |
| 4339-1 | 364 | 848 | 600 | 1066 | 1528 | 8.4 |
| 4339-1 | 364 | 848 | 1200 | 1037 | 1481 | 8.2 |
| 4339-2 | 315 | 816 | 300 | 1145 | 1641 | 7.5 |
| 4339-2 | 315 | 816 | 600 | 1126 | 1640 | 6.4 |
| 4339-2 | 315 | 816 | 1200 | 1098 | 1594 | 7.6 |
| 4340-1 | 259 | 782 | 300 | 1263 | 1881 | 7.6 |
| 4340-1 | 259 | 782 | 600 | 1226 | 1811 | 7.5 |
| 4340-1 | 259 | 782 | 1200 | 1224 | 1786 | 8.3 |
| 4340-2 | 229 | 759 | 300 | 1328 | 2011 | 7.8 |
| 4340-2 | 229 | 759 | 600 | 1307 | 1999 | 7.8 |
| 4340-2 | 229 | 759 | 1200 | 1216 | 1917 | 7.9 |
| 4341-1 | 241 | 821 | 300 | 1310 | 1922 | 7.7 |
| 4341-1 | 241 | 821 | 600 | 1260 | 1859 | 8.0 |
| 4341-1 | 241 | 821 | 1200 | 1220 | 1811 | 7.4 |
| 4341-2 | 285 | 836 | 300 | 1389 | 1985 | 7.6 |
| 4341-2 | 285 | 836 | 600 | 1317 | 1905 | 7.5 |
| 4341-2 | 285 | 836 | 1200 | 1254 | 1814 | 7.6 |
| 4342-1 | 294 | 821 | 300 | 1297 | 1891 | 7.8 |
| 4342-1 | 294 | 821 | 600 | 1218 | 1854 | 7.4 |
| 4342-1 | 294 | 821 | 1200 | 1247 | 1837 | 7.5 |
| 4342-2 | 263 | 841 | 300 | 1425 | 2006 | 7.3 |
| 4342-2 | 263 | 841 | 600 | 1324 | 1945 | 7.4 |
| 4342-2 | 263 | 841 | 1200 | 1352 | 1914 | 7.4 |
| 22MnB5 | 410 | 930 | 300 | 1034 | 1461 | 8 |

While substitutional elements are typically considered to be very weak solute strengtheners in as-quenched martensite, the ultimate tensile strength remarkably increased by approximately 156 MPa per weight percent of manganese addition and by approximately 83 MPa per weight percent of chromium addition. Most surprisingly, there was no degradation in elongation to fracture (that is, total elongation) relative to the conventional 22MnB5 steel for steels with ultimate tensile strengths up to and exceeding 2000 MPa. Ultimate tensile strengths in excess of 1800 MPa were achieved using several alloying strategies: Mn (4340-1, 4340-2), Mn+Mo+Nb (4341-1), Mn+Mo+Nb+V (4341-2), Mn+Cr (4342-2). For all of these alloys, total elongation was 7-8%.

Figure 2:
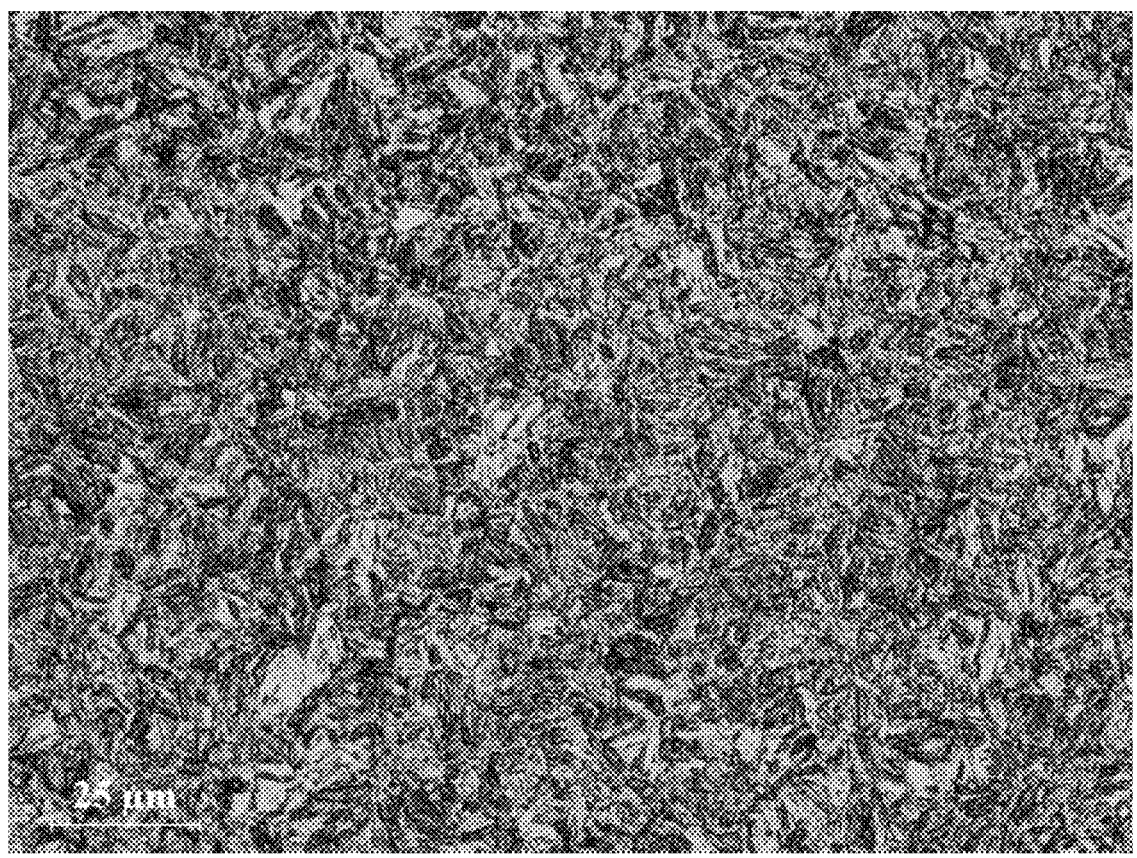
FIG. 2 depicts a light optical micrograph of a press hardened steel of alloy 4339-2 after austenitizing at PMT 816° C. for 300 seconds and simulated press hardening.
Figure 3:
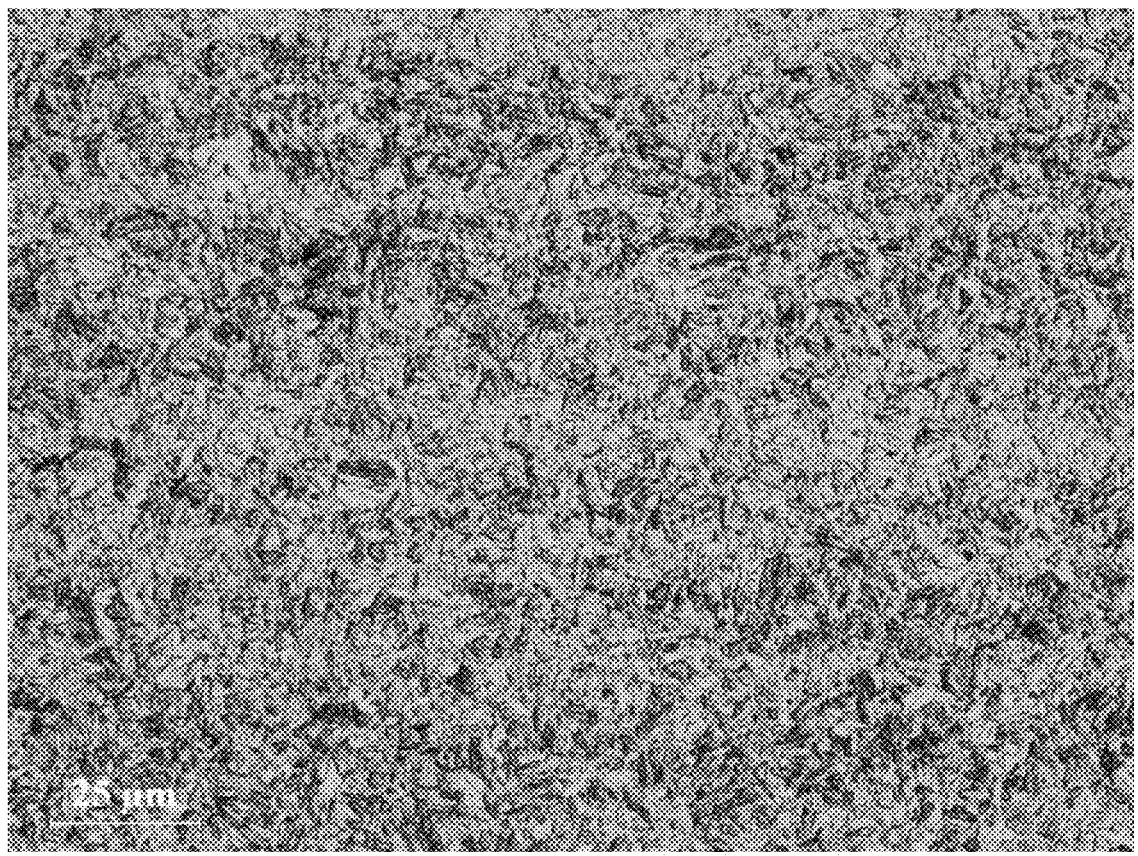
FIG. 3 depicts a light optical micrograph of a press hardened steel of alloy 4340-1 after austenitizing at PMT 782° C. for 300 seconds and simulated press hardening.
Figure 4:
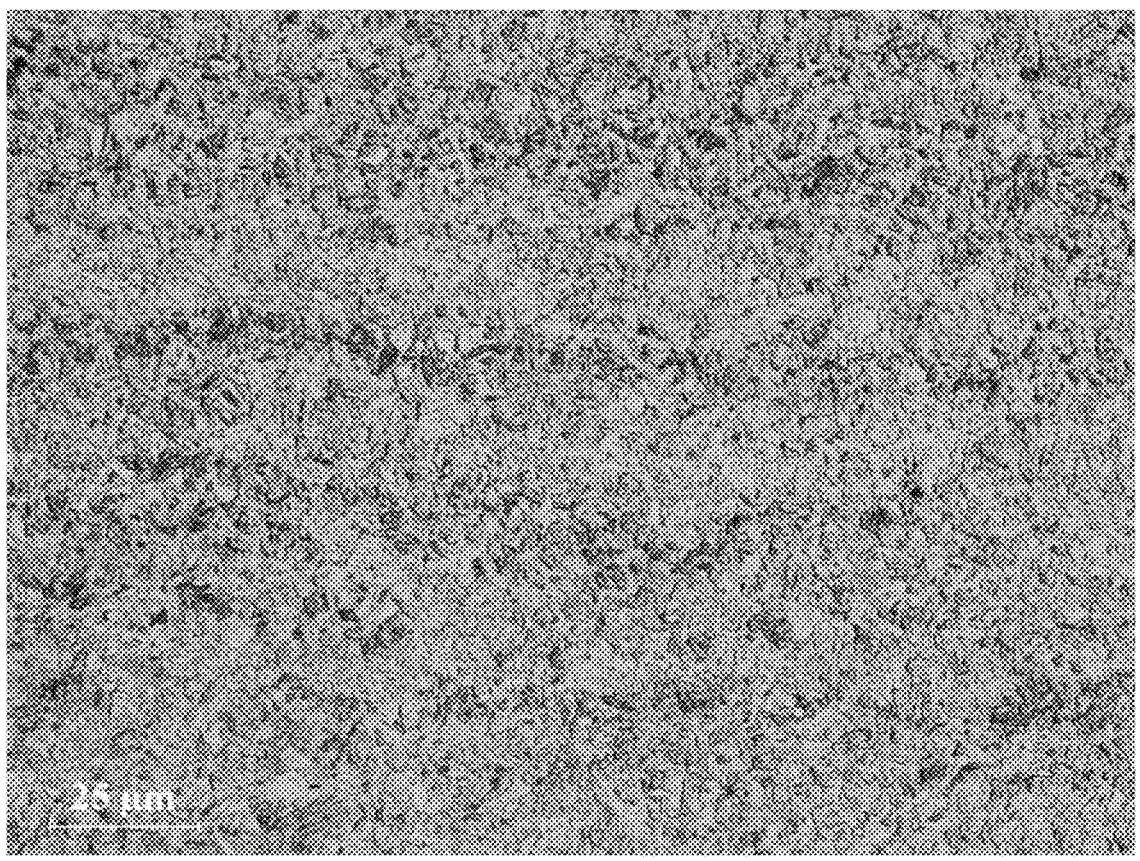
FIG. 4 depicts a light optical micrograph of a press hardened steel of alloy 4340-2 after austenitizing at PMT 759° C. for 300 seconds and simulated press hardening.
Figure 5:
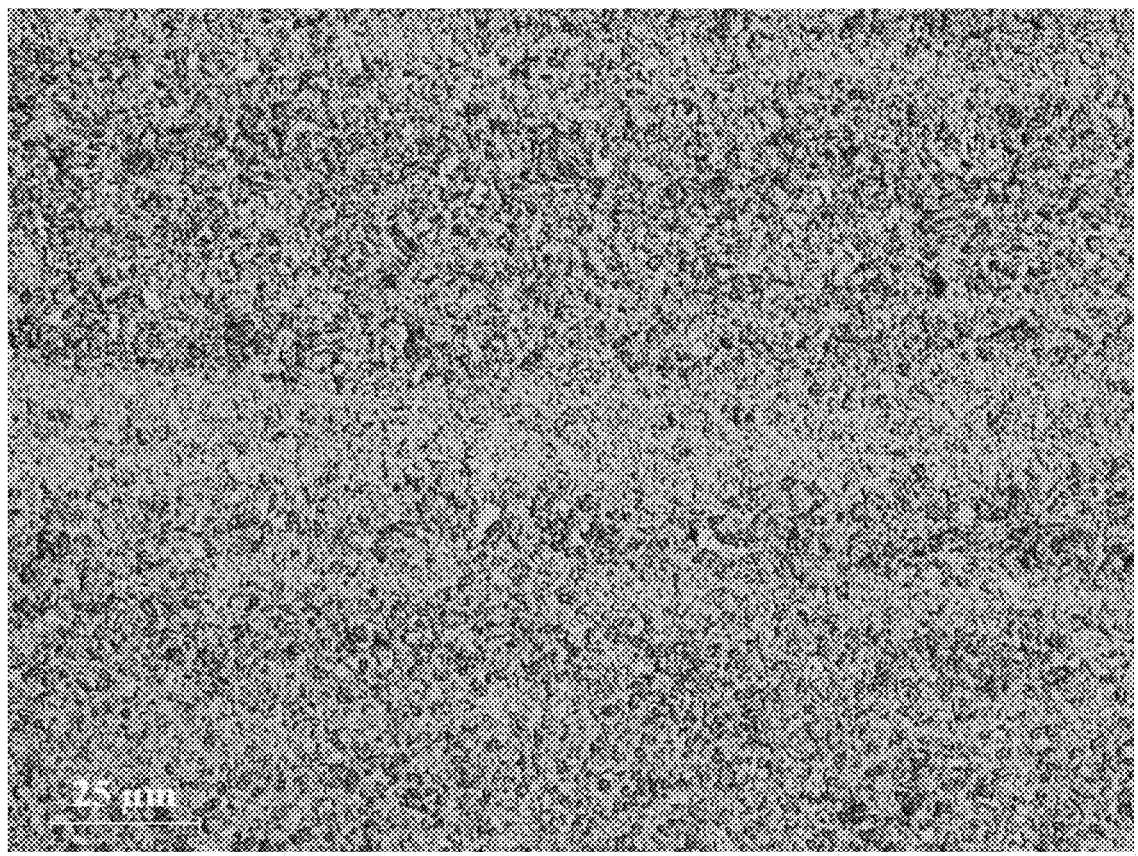
FIG. 5 depicts a light optical micrograph of a press hardened steel of alloy 4341-1 after austenitizing at PMT 821° C. for 300 seconds and simulated press hardening.
Figure 6:
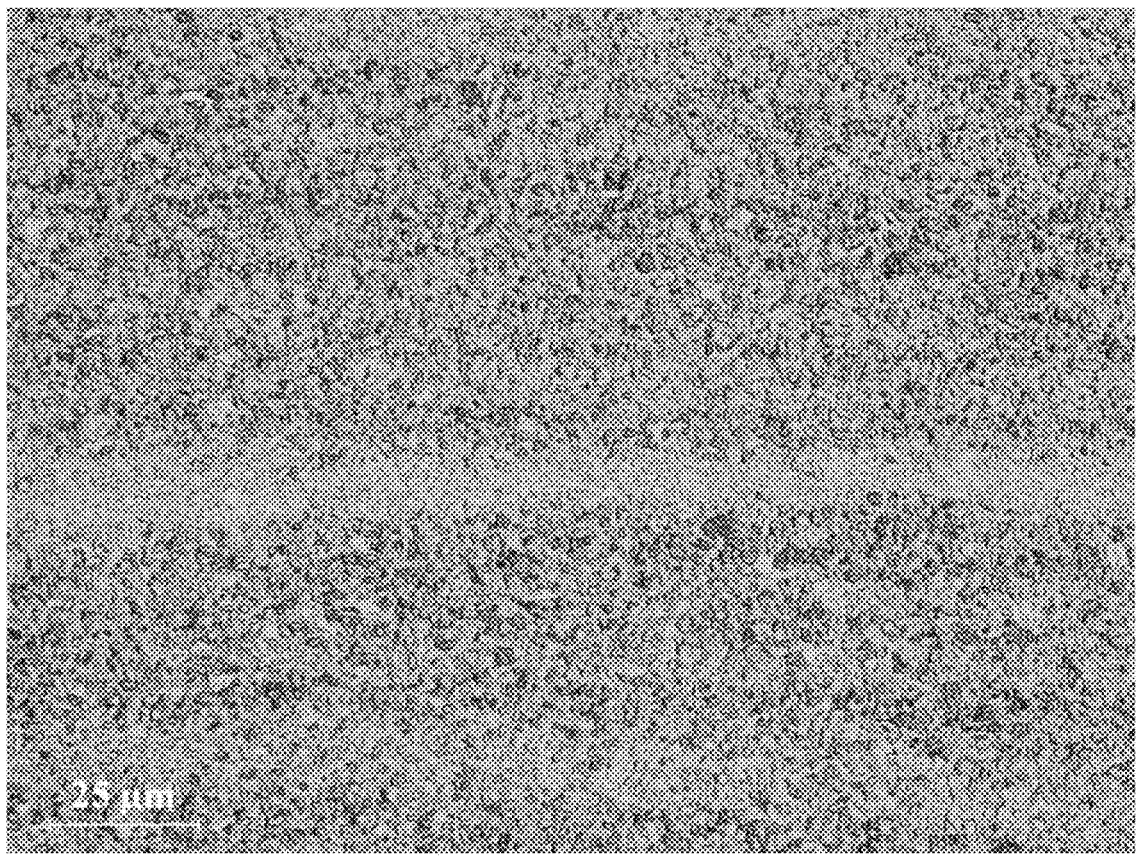
FIG. 6 depicts a light optical micrograph of a press hardened steel of alloy 4341-2 after austenitizing at PMT 836° C. for 300 seconds and simulated press hardening.
Figure 7:
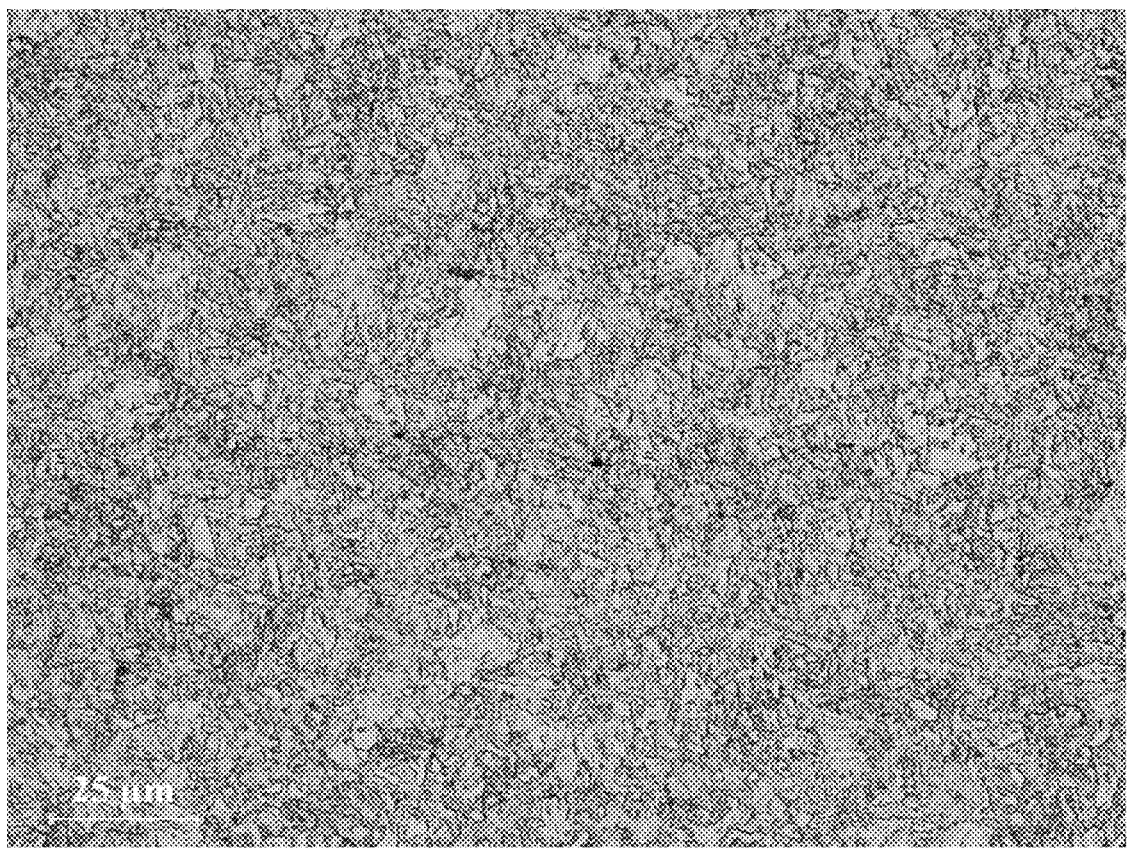
FIG. 7 depicts a light optical micrograph of a press hardened steel of alloy 4342-1 after austenitizing at PMT 821° C. for 300 seconds and simulated press hardening.
Figure 8:
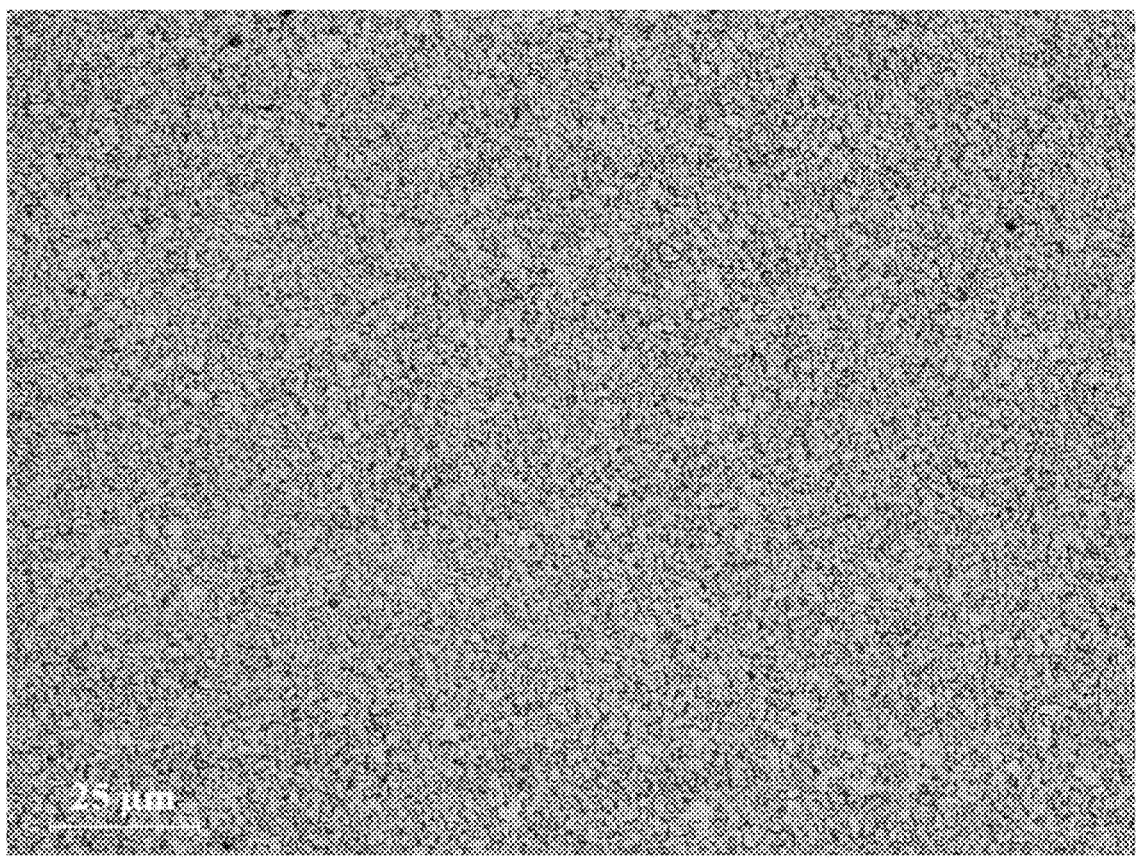
FIG. 8 depicts a light optical micrograph of a press hardened steel of alloy 4342-2 after austenitizing at PMT 841° C. for 300 seconds and simulated press hardening.

FIG. 1-8 are light optical micrographs after austenitizing for 300 seconds and simulated press hardening of the steels in accordance with the parameters of Table 2. These figures show a primarily martensitic structure with increasing grain refinement as one moves from FIG. 1 through FIG. 8, in part because of smaller starting austenite grain structure resulting from the lower austenitization temperature and/or because of the refinement resulting from the additional alloying.

Example 2

Mechanical properties were assessed after a press hardening simulation in which samples of the steel alloy 4340-2 was austenitized at varying temperatures and time. The samples were then quenched in flat, water-cooled copper dies. Uniaxial tensile tests at room temperature and quasi-static rates were performed to measure the strength and elongation of the press hardened steels. Table 3 summarizes processing temperatures and mechanical properties of the samples after austenizing for a specified time. The trial samples showed the benefit of the lower austenization temperature made possible by the present press hardened alloys. As shown in Table 3, the higher austenization temperature resulted in lower yield strength and tensile strength. Additionally, the ultimate tensile strength obtained at the lowest austenitization temperature still exceeds 1900 MPa after austenitizing for 1200 seconds prior to press hardening, which demonstrates beneficial robustness to the process window for this alloy.

TABLE 3

Mechanical Properties of Alloy 4340-2 After Austenization for Time and Simulated Press Hardening

| Alloy | Temperature (° C.) | Time (s) | Yield Strength (MPa) | Ultimate Tensile Strength (MPa) | Total Elongation (%) |
|---|---|---|---|---|---|
| 4340-2 | 755 | 1200 | 1171 | 1912 | 7.7 |
| 4340-2 | 800 | 300 | 1100 | 1885 | 8.0 |
| 4340-2 | 900 | 1200 | 1005 | 1706 | 7.3 |

Example 3

A press hardenable steel comprising by total weight percentage of the steel:
(a) from 0.1% to 0.5%, preferably from 0.1% to 0.35%, more preferably from 0.22-0.25%, Carbon;
(b) from 2.0% to 8.0%, preferably from greater than 3.0% to 8%; more preferably from 2.0 to 5.0%, and more preferably from greater than 3.0% to 5.0%, Manganese; and
(c) from 0.1% to 0.5%, preferably from 0.2% to 0.3%, Silicon;
wherein said steel is substantially fully austenitized prior to forming and quenching in a hot stamping die.

Example 4

A press hardenable steel of Example 4 or any one of the following Examples, further comprising from 0.0% to 6.0%, preferably from 0.0% to 2.0%, more preferably 0.1% to 6.0%, more preferably 0.1% to 2.0%, more preferably 0.1% to 0.6%, and more preferably 0.4% to 0.5%, Molybdenum.

Example 5

A press hardenable steel of either one of Examples 3 and 4, or any one of the following Examples, further comprising from 0% to 6.0%, preferably 0.2% to 6.0%, more preferably 2.0% to 6.0%, and more preferably 0.2% to 3.0%, Chromium.

Example 6

A press hardenable steel of any one of Examples 3 through 5, or any one of the following Examples, further comprising from 0.0% to 0.1%, preferably 0.01% to 0.1%, more preferably 0.001 to 0.055% Niobium.

Example 7

A press hardenable steel of any one Examples 3 through 6, or any one of the following Examples, further comprising from 0.0% to 0.15%, preferably 0.01% to 0.15%, Vanadium.

Example 8

A press hardenable steel of any Examples 3 through 7, or any one of the following Examples, further comprising from 0% to 0.005% Boron.

Example 9

A press hardenable steel of any of Examples 3 through 8, or any one of the following Examples, wherein the $M_s$ temperature is less than 365° C.

Example 10

A press hardenable steel of any of Examples 3 through 9, or any one of the following Examples, wherein the PMT for austenization is less than 850° C.

Example 11

A press hardenable steel of any one of Examples 3 through 10, or any one of the following Examples, wherein the press hardenable steel has, after press hardening or hot stamping, an ultimate tensile strength of at least 1480 MPa and a total elongation of at least 6%.

Example 12

A press hardenable steel of any one of Examples 3 through 11, wherein the press hardenable steel is coated with an aluminum-based coating or a zinc-based coating (either galvanized or galvannealed), after cold rolling and before hot stamping.

What is claimed is:

1. A press hardenable steel comprising, by weight percent, 0.22-0.25% carbon, 2.0 to 3.0% manganese, 0.2-0.3% silicon, 0.2 to 6.0% chromium, no more than 0.004% aluminum, and at least one of 0.1 to 0.6% molybdenum, 0.01 to 0.1% niobium, or 0.01 to 0.15% vanadium, the balance comprising iron and incidental impurities, wherein the ultimate tensile strength of such steel is greater than 1800 MPa, and a total elongation of such steel is at least 6%.

2. The press hardenable steel of claim 1 comprising 0.4 to 0.6% molybdenum.

3. The press hardenable steel of claim 1 comprising 2.0 to 6.0% chromium.

4. The press hardenable steel of claim 1 having two outer surfaces, and further comprising an aluminum-based coating or a zinc-based coating applied to at least one outer surface.

5. The press hardenable steel of claim 1, wherein the press hardenable steel can be fully austenitized at a PMT of less than 850° C.

6. The press hardenable steel of claim 1 comprising 0.4-6.0% chromium.

7. The press hardenable steel of claim 1, without the intentional addition of titanium.

8. The press hardenable steel of claim 1, without the intentional addition of antimony.

9. The press hardenable steel of claim 1, wherein vanadium is 0.01 to 0.1%.

10. The press hardenable steel of claim 1, without the intentional addition of boron.

11. The press hardenable steel of claim 1, without the intentional addition of antimony and boron.

12. The press hardenable steel of claim 1, without the intentional addition of antimony and boron, and where vanadium is 0.01 to 0.1%.

13. The press hardenable steel of claim 1, wherein chromium is 0.2 to less than 3.0%.

* * * * *